US012548485B2

(12) United States Patent
Zhang et al.

(10) Patent No.: US 12,548,485 B2
(45) Date of Patent: Feb. 10, 2026

(54) DISPLAY PANEL AND DISPLAY APPARATUS

(71) Applicant: BOE Technology Group Co., Ltd., Beijing (CN)

(72) Inventors: Hao Zhang, Beijing (CN); Chunyan Xie, Beijing (CN); Hao Liu, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/858,393

(22) PCT Filed: Jan. 2, 2024

(86) PCT No.: PCT/CN2024/070023
§ 371 (c)(1),
(2) Date: Oct. 21, 2024

(87) PCT Pub. No.: WO2024/146492
PCT Pub. Date: Jul. 11, 2024

(65) Prior Publication Data

US 2025/0265955 A1 Aug. 21, 2025

(30) Foreign Application Priority Data

Jan. 5, 2023 (CN) ........................ 202310015770.2

(51) Int. Cl.
*G09G 3/3208* (2016.01)
*G09G 3/00* (2006.01)

(52) U.S. Cl.
CPC ........... *G09G 3/035* (2020.08); *G09G 3/3208* (2013.01); *G09G 2300/0408* (2013.01);
(Continued)

(58) Field of Classification Search
CPC ................. G09G 3/035; G09G 3/3208; G09G 2300/0408; G09G 2300/0426; G09G 2330/023; G09G 2340/145
See application file for complete search history.

(56) References Cited

FOREIGN PATENT DOCUMENTS

CN 106814808 A * 6/2017 ............ G04G 21/00
CN 210805780 U 6/2020
(Continued)

OTHER PUBLICATIONS

Office Action dated Mar. 28, 2025, issued in counterpart CN Application No. 202310015770.2, with English translation. (17 pages).

*Primary Examiner* — Robert J Michaud
(74) *Attorney, Agent, or Firm* — WHDA, LLP

(57) ABSTRACT

A display panel includes a primary screen, an auxiliary screen and a connecting region, the primary screen and the auxiliary screen are connected via the connecting region, and the auxiliary screen at least partially surrounds the primary screen. A primary displaying region is disposed inside the primary screen, a plurality of first data lines are disposed within the primary displaying region, and the first data lines are configured to provide data signals to a plurality of pixels within the primary displaying region. An auxiliary displaying region is disposed inside the auxiliary screen, a plurality of second data lines are disposed within the auxiliary displaying region, and the second data lines are configured to provide data signals to a plurality of pixels within the auxiliary displaying region. A displaying device is further provided.

14 Claims, 4 Drawing Sheets

(52) U.S. Cl.
CPC ............... *G09G 2300/0426* (2013.01); *G09G 2320/0233* (2013.01); *G09G 2330/023* (2013.01); *G09G 2340/145* (2013.01)

(56) References Cited

FOREIGN PATENT DOCUMENTS

| | | | | | |
|---|---|---|---|---|---|
| CN | 114784077 | A | * | 7/2022 | ......... H10K 59/1315 |
| CN | 115981131 | A | | 4/2023 | |

* cited by examiner

DISPLAY PANEL AND DISPLAY APPARATUS

The present application claims the priority of the Chinese patent application filed on Jan. 5, 2023 before the Chinese Patent Office with the application number of 202310015770.2 and the title of "DISPLAY PANEL AND DISPLAY APPARATUS", which is incorporated herein in its entirety by reference.

TECHNICAL FIELD

The present application relates to the technical field of displaying and, more particularly, to a display panel and a displaying device.

BACKGROUND

A wearable device (for example, a smart watch) is provided with a display screen, and exhibits information via the display screen. With the increasing of the functions of the wearable device, the information required to be exhibited increases correspondingly, and a more flexible information exhibition mode is urgently needed.

SUMMARY

A display panel and a displaying device are provided by the embodiments of the present application, thus the information exhibition is more flexible.

In order to achieve the above object, the following technical solutions are employed by the embodiments of the present application.

In an aspect, a display panel is provided, wherein the display panel includes a primary screen, an auxiliary screen and a connecting region, the primary screen and the auxiliary screen are connected via the connecting region, and the auxiliary screen at least partially surrounds the primary screen; a primary displaying region is disposed inside the primary screen, a plurality of first data lines are disposed within the primary displaying region, and the first data lines are configured to provide data signals to a plurality of pixels within the primary displaying region; and an auxiliary displaying region is disposed inside the auxiliary screen, a plurality of second data lines are disposed within the auxiliary displaying region, and the second data lines are configured to provide data signals to a plurality of pixels within the auxiliary displaying region; a plurality of first connecting lines and a plurality of second connecting lines are disposed inside the display panel, and one end of each of the first connecting lines and one end of each of the second connecting lines are electrically connected to a driving chip to obtain data signals of the driving chip; and the other ends of the first connecting lines are connected to the first data lines, and the other ends of the second connecting lines are connected to the second data lines passing through the connecting region.

In some embodiments, the auxiliary screen is a strip-shaped screen, the strip-shaped screen includes a first edge extending in a length direction, and the first edge at least partially surrounds a periphery of the primary screen.

In some embodiments, the auxiliary displaying region includes a plurality of pixel columns, and a plurality of pixels included by each of the plurality of pixel columns are arranged in an extending direction of the first edge; and the second data lines extend in a direction of the pixel columns, and are configured for that each of the second data lines provides data signals to the pixels in one of the pixel columns.

In some embodiments, the second data lines are broken at a first position, to form first data sub-lines and second data sub-lines, some of the second connecting lines are connected to the first data sub-lines, and some of the second connecting lines are connected to the second data sub-lines.

In some embodiments, at the first position, the second data lines form first ends located at the first data sub-lines and second ends located at the second data sub-lines; and the first position is adjacent to the connecting region, some of the second connecting lines are connected to the first ends, and some of the second connecting lines are connected to the second ends.

In some embodiments, the auxiliary screen includes a substrate, a driving circuit and a light emitting device, the driving circuit and the light emitting device are arranged sequentially in layer configuration on the substrate, the driving circuit includes a first conducting layer and a second conducting layer that are arranged in different layers, the second data lines are located at the first conducting layer, a part of wiring of the second connecting lines is located at the second conducting layer, and the second connecting lines and the second data lines are connected through via holes.

In some embodiments, a first non-displaying region surrounding the primary displaying region is disposed inside the primary screen, the first non-displaying region is connected to the connecting region, and a part of wiring of the second connecting lines is located within the first non-displaying region.

In some embodiments, a part of wiring of the second connecting lines is located within the primary displaying region.

In some embodiments, the primary displaying region includes a substrate, a driving circuit and a light emitting device, the driving circuit and the light emitting device are arranged sequentially in layer configuration on the substrate, the driving circuit includes a third conducting layer, and a part of the wiring of the second connecting lines is located at the third conducting layer.

In some embodiments, a data selecting circuit is disposed within the connecting region, and the second connecting lines are connected to the second data lines via the data selecting circuit.

In some embodiments, the auxiliary displaying region includes a plurality of pixel rows, and a plurality of pixels included by each of the pixel rows are arranged in a second direction, wherein the second direction intersects with the extending direction of the first edge; and a second non-displaying region surrounding the auxiliary displaying region is disposed inside the auxiliary screen, a gate driving circuit is disposed within the second non-displaying region, and the gate driving circuit is located at a second edge of the auxiliary screen, wherein the second edge and the first edge are opposite.

In some embodiments, the second conducting layer further includes a signal line, one end of the signal line is configured to be connected to the driving chip, and the other end of the signal line is connected to the gate driving circuit passing through the connecting region and the auxiliary displaying region.

In some embodiments, the auxiliary screen is a ring-shaped screen, and the plurality of pixels in the pixel rows are arranged in radial directions of the auxiliary screen.

In another aspect, a displaying device is provided, wherein the displaying device includes the display panel.

In some embodiments, the connecting region of the display panel is bent, and there is a predetermined included angle between a light-exiting surface of the primary screen and a light-exiting surface of the auxiliary screen.

In the display panel and the displaying device according to the embodiments of the present application, the display panel includes the primary screen, the auxiliary screen and the connecting region connecting the primary screen and the auxiliary screen, and the second connecting lines configured for providing the data signals for the pixels in the auxiliary screen enter the primary screen via the connecting region, so that the first connecting lines configured for providing the data signals for the pixels in the primary screen can be converged with the second connecting lines, and in turn be connected to the driving chip. In other words, the primary screen and the auxiliary screen can share the driving chip, as compared with the case where the primary screen and the auxiliary screen are individually provided with a driving chip, the quantity of the driving chips is reduced, and the power consumption is reduced.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to these figures without paying creative work.

REFERENCE NUMBERS

Figure 1:
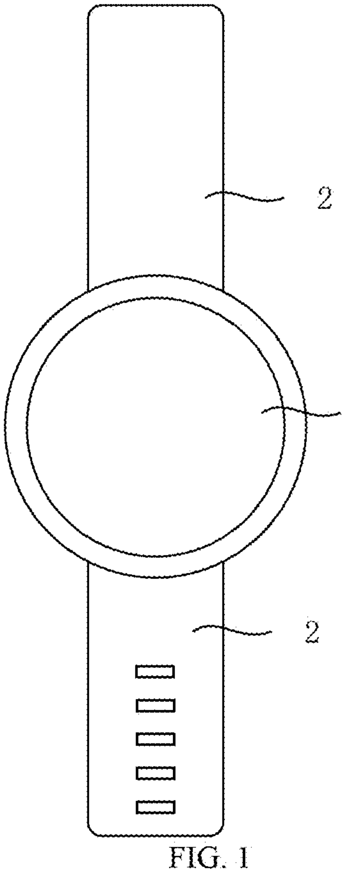
FIG. 1 is a schematic diagram of a displaying device according to an embodiment of the present application.

1—main body; 2—watchband;
100—display panel;
110—primary screen; 111—primary displaying region; 112—first non-displaying region;
120—auxiliary screen; 121—first edge; 122—second data lines; 122*a*—first data sub-lines; 122*b*—second data sub-lines; 123—second connecting lines; 124—gate driving circuit;
130—connecting region;
140—driving region; and
150—driving chip.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, terms such as "first", "second", "third" and "fourth" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

In the embodiments of the present application, the meaning of "plurality of" is "two or more", and the meaning of "at least one" is "one or more", unless explicitly and particularly defined otherwise.

In the embodiments of the present application, the terms that indicate orientation or position relations, such as "upper" and "lower", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application.

As shown in FIG. 1 to FIG. 8, a displaying device is provided by an embodiment of the present application. The displaying device may be a mobile phone, a notebook computer, an ultra-mobile personal computer (UMPC), a netbook, a personal digital assistant (PDA), a wearable device, a virtual-reality device, a mobile computing device or another device that has a display panel 100, which is not limited in the embodiments of the present application. In order to facilitate the description, in the present application, it is taken as an example for the description that the displaying device is a smart watch.

FIG. 1 is a schematic diagram of a displaying device according to an embodiment of the present application. As shown in FIG. 1, the displaying device may include a main body 1 and a watchband 2. The main body 1, as the major frame of the displaying device, is used to realize the major functions (for example, communicating, movement monitoring and health monitoring) of the displaying device. The watchband 2 is connected to the main body 1, and is used to make that the main body 1 is detachably worn on the wrist of the user. For example, as shown in FIG. 1, the displaying device includes two watchbands 2, one of the two watchbands 2 is connected to the upper side of the main body 1, the other of the two watchbands 2 is connected to the lower side of the main body 1, and, in wearing, the two watchbands 2 surround the wrist of the user and are connected via a clip component (not shown in the figure). It can be understood that, in practical applications the main body may also be worn on the wrist of the user in other modes, which are not limited in the embodiments of the present application.

The main body includes a housing and a display panel 100 connected to the housing.

The housing, as the skeleton of the main body, is used to support and connect the components of the displaying device.

As an example, the housing is provided with a groove, and the interior of the groove is used to contain the components of the displaying device such as the central processing unit, the mainboard, the internal memory, the battery, the sensing devices and the communicating components. The display panel 100 covers the opening of the groove to cause the groove to be sealed, thereby the components contained inside the groove are protected.

As an example, when the housing is provided with the groove, the outer wall of the groove is connected to the watchband. The watchband and the housing may be of an integral structure, and the watchband may also be detachably connected to the outer wall of the groove, to facilitate the repairment and the replacement of the watchband.

Figure 2:
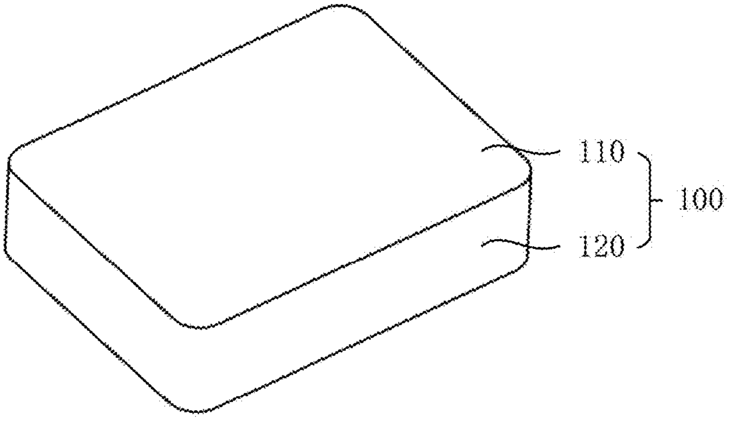
FIG. 2 is a schematic diagram of the main body of a displaying device according to an embodiment of the present application.
Figure 3:
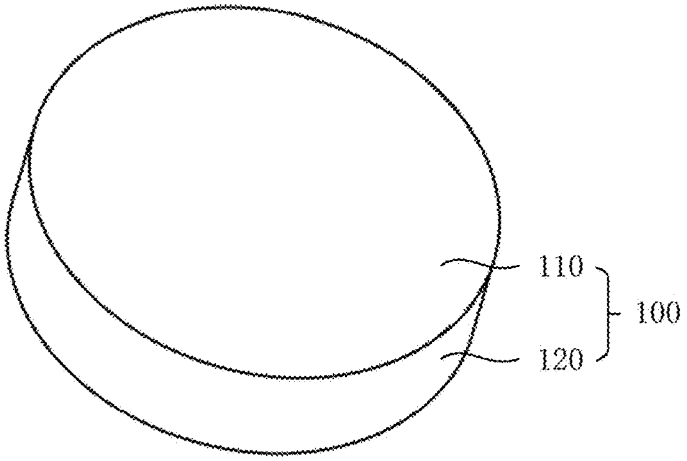
FIG. 3 is a schematic diagram of the main body of another displaying device according to an embodiment of the present application.
Figure 4:
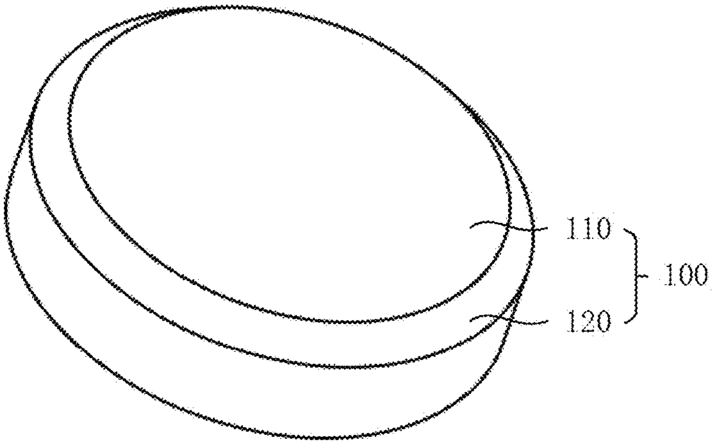
FIG. 4 is a schematic diagram of the main body of yet another displaying device according to an embodiment of the present application.

FIG. 2 is a schematic diagram of the main body of a displaying device according to an embodiment of the present application. FIG. 3 is a schematic diagram of the main body of another displaying device according to an embodiment of the present application. FIG. 4 is a schematic diagram of the main body of yet another displaying device according to an embodiment of the present application. As shown in FIG. 2, FIG. 3 and FIG. 4, the shape of the housing may be overall a cuboid, a cylinder and so on. Certainly, the shape of the housing may also be overall a polygon prism, an elliptic cylinder, a frustum, a truncated pyramid and so on. The shape of the housing is not limited in the embodiments of the present application.

The material of the housing may be a metal, and may also be a plastic, which may be selected flexibly according to demands in practical applications.

The display panel 100 may be an electroluminescent display panel or a photoluminescent display panel. If the display panel 100 is an electroluminescent display panel, the electroluminescent display panel may be an organic electroluminescent diode (referred to for short as OLED) display panel, a quantum-dot electroluminescent diode (referred to for short as QLED) display panel or an active-matrix organic light emitting diode (referred to for short as AMOLED) display panel. Organic-light-emitting-diode display panels, because of the advantages such as self-illumination, a low driving voltage, a high luminous efficiency, a high response speed and flexible displaying, have already been extensively applied in the field of displaying, and therefore in the embodiments of the present application, it is taken as an example for the description that the display panel 100 is an OLED display panel.

The display panel 100 may display images, and exhibit information to the user by using the displayed images. For example, the display panel 100 exhibits the communicating state, the movement monitoring data, the health monitoring data, and so on, of the displaying device to the user by displaying images. The images displayed by the display panel 100 may be static images, and may also be dynamic images. The contents of the images may be texts, may also be pictures, and may also be both of texts and pictures.

In order to improve the flexibility of the information exhibition by the display panel 100, the display panel 100 may include a primary screen 110 and an auxiliary screen 120. During the working of the displaying device, the primary screen 110 and the auxiliary screen 120 may be separately controlled. For example, when the display panel 100 displays images, the primary screen 110 and the auxiliary screen 120 may display images simultaneously, or any one of the primary screen 110 and the auxiliary screen 120 displays images. When the primary screen 110 and the auxiliary screen 120 display images simultaneously, the primary screen 110 and the auxiliary screen 120 may display the same images, and may also display different images.

As an example, as shown in FIG. 2, the main body is overall of a cuboid structure, the primary screen 110 may be disposed at the top surface of the main body, and the auxiliary screen 120 may be disposed at the side surface of the main body.

As an example, as shown in FIG. 3, the main body is overall of a cylinder structure, the primary screen 110 may be disposed at the top surface of the main body, and the auxiliary screen 120 may be disposed at the side surface of the main body.

As an example, as shown in FIG. 4, the main body is overall of a cylinder structure, the primary screen 110 may be disposed at the top surface of the main body, the auxiliary screen 120 may be disposed between the top surface and the side surface of the main body, and there is a certain included angle between the light-exiting surface of the auxiliary screen 120 and the light-exiting surface of the primary screen 110.

It should be noted that, in the above three examples, the auxiliary screen 120 surrounds the primary screen 110 by one circle, and the whole of the periphery of the primary screen 110 is correspondingly provided with the auxiliary screen 120. In practical applications, the auxiliary screen 120 may also partially surround the primary screen 110. For example, in the example shown in FIG. 2, the auxiliary screen 120 may cover merely one side surface among the four side surfaces of the main body, or two side surfaces among the four side surfaces of the main body, or three side surfaces among the four side surfaces of the main body.

The naming of the primary screen 110 and the auxiliary screen 120 is merely in order to distinguish the two display screens, there is not a structural or functional dependency relation between the primary screen 110 and the auxiliary screen 120, and the names of the primary screen 110 and the auxiliary screen 120 are exchangeable. For example, in some examples, the primary screen 110 may also be referred to as the auxiliary screen 120, and the auxiliary screen 120 may also be referred to as the primary screen 110.

When the primary screen 110 and the auxiliary screen 120 displays different images, as an example, the primary screen 110 may be configured to display the communicating state, the movement monitoring data, the health monitoring data and so on, and the auxiliary screen 120 may be configured to display the Bluetooth connection state, the residual capacity and so on. In this way, the flexibility of the information exhibition by the displaying device can be increased.

An area of the primary screen 110 may be greater than an area of the auxiliary screen 120 or less than the area of the auxiliary screen 120, and the area of the primary screen 110 may also be equal to the area of the auxiliary screen 120. The relative sizes of the primary screen 110 and the auxiliary screen 120 are not limited in the embodiments of the present application.

The primary screen 110 and the auxiliary screen 120 are not two independent display screens, but they belong to the same display panel 100, and are connected by a connecting region 130 to be of an integral structure. In other words, the display panel 100 is divided into three regions, which are the primary screen 110, the auxiliary screen 120 and the connecting region 130 located between the primary screen 110 and the auxiliary screen 120.

Figure 5:
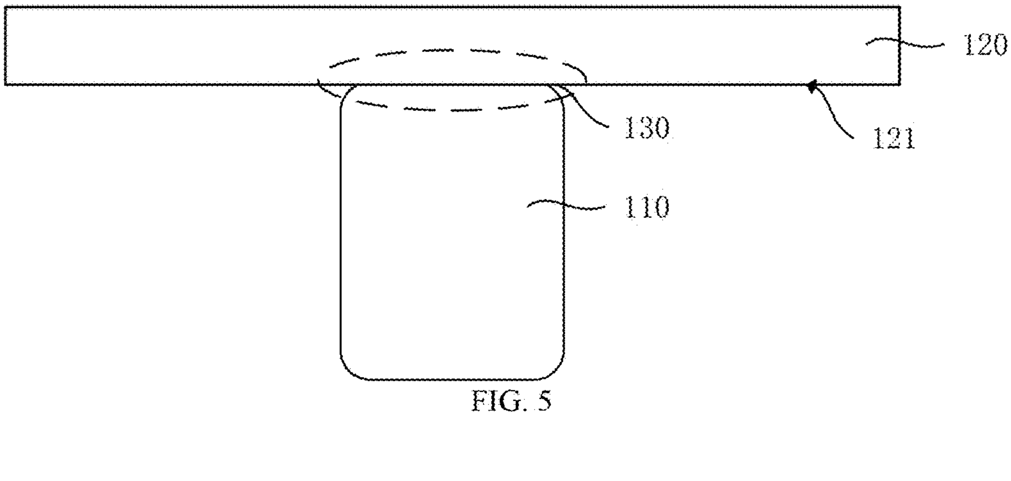
FIG. 5 is a schematic diagram of a display panel according to an embodiment of the present application.
Figure 6:
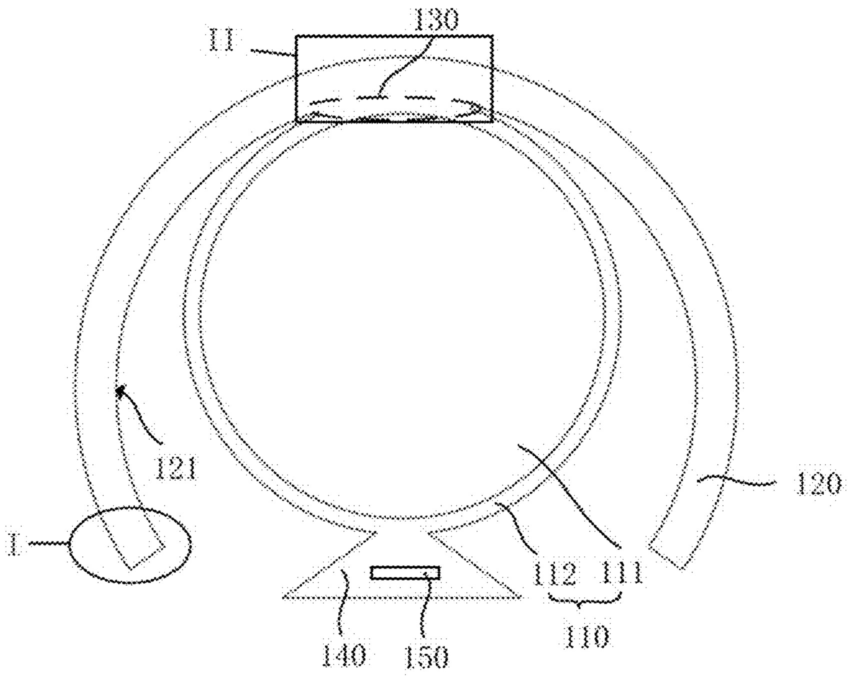
FIG. 6 is a schematic diagram of another display panel according to an embodiment of the present application.

FIG. 5 is a schematic diagram of a display panel according to an embodiment of the present application. FIG. 6 is a schematic diagram of another display panel according to an embodiment of the present application. Referring to FIG. 5 and FIG. 6, the auxiliary screen 120 is a strip-shaped screen. The strip-shaped screen refers to that the auxiliary screen 120 is overall elongated, wherein the size of the auxiliary screen 120 in the length direction is significantly greater than the dimension size of the auxiliary screen 120 in the width direction. The strip-shaped screen includes a first edge 121 extending in the length direction, and, after the auxiliary screen 120 is bent, the first edge 121 at least partially surrounds the periphery of the primary screen 110.

As an example, as shown in FIG. 5, the display panel 100 includes the primary screen 110 that is overall rectangular, the auxiliary screen 120 that is overall strip-shaped, and the connecting region 130 connecting the primary screen 110 and the auxiliary screen 120. In the fabrication of the displaying device, the display panel 100 is bent along a common edge of the primary screen 110 and the auxiliary screen 120 within the connecting region 130 to cause that there is an included angle of 270° between the light-exiting surface of the primary screen 110 and the light-exiting surface of the auxiliary screen 120. Subsequently, the auxiliary screen 120 is bent along the periphery of the primary screen 110 to cause the first edge 121 to surround the periphery of the primary screen 110, and the two ends of the auxiliary screen 120 are butted to form the structure of the display panel 100 in the example shown in FIG. 2.

As an example, as shown in FIG. 6, the display panel 100 includes the primary screen 110 that is overall circular, the auxiliary screen 120 that is overall circular-arc-strip-shaped, and the connecting region 130 connecting the primary screen 110 and the auxiliary screen 120. In the fabrication of the displaying device, the display panel 100 is bent along the common edge of the primary screen 110 and the auxiliary screen 120 within the connecting region 130 to cause that there is an included angle of 225° between the light-exiting surface of the primary screen 110 and the light-exiting surface of the auxiliary screen 120. Subsequently, the auxiliary screen 120 is bent along the periphery of the primary screen 110 to cause the first edge 121 to surround the periphery of the primary screen 110, and the two ends of the auxiliary screen 120 are butted to cause the auxiliary screen 120 to surround the primary screen 110 by one circle, to form the structure of the display panel 100 in the example shown in FIG. 4. Certainly, the included angle between the light-exiting surface of the primary screen 110 and the light-exiting surface of the auxiliary screen 120 may also be other angles. For example, when they have an included angle of 270°, the display panel 100 in the example shown in FIG. 3 is formed.

In the examples shown in FIG. 5 and FIG. 6, the shape of the primary screen 110 and the shape of the auxiliary screen 120 are different. In practical applications, the shape of the primary screen 110 and the shape of the auxiliary screen 120 may also be the same.

The connecting region 130 connects the primary screen 110 and the auxiliary screen 120, and the shape and the size of the connecting region 130 are not limited in the embodiments of the present application. As an example, as shown in FIG. 5, the connecting region 130 may be the common edge of the primary screen 110 and the auxiliary screen 120. As an example, as shown in FIG. 6, the connecting region 130 may be the peripheral region of the tangent point of the primary screen 110 and the auxiliary screen 120.

Because the position between the primary screen 110 and the auxiliary screen 120 is bent via the connecting region 130, if the connecting region 130 is smaller, that is more beneficial to the relative bending between the primary screen 110 and the auxiliary screen 120. Especially, when the shape of the display panel 100 is the shape shown in FIG. 6 (when the primary screen 110 is a circular primary screen 110, and the auxiliary screen 120 is a circular-are-strip-shaped auxiliary screen 120), if the connecting region 130 is excessively large, the size of the connecting region 130 in the horizontal direction shown in FIG. 6 is greater, resulting in that after the primary screen 110 and the auxiliary screen 120 relatively bend, the primary screen 110 and the auxiliary screen 120 easily have wrinkles.

Certainly, the primary screen 110 and the auxiliary screen 120 of the display panel 100 may also be located in the same plane, at this moment, the connecting region 130 is not bent.

The display panel 100 may be connected to a driving chip 150 configured to drive the display panel 100. The driving chip 150 may provide data signals for driving the primary screen 110 to display images, and data signals for driving the auxiliary screen 120 to display images. The driving chip 150 may be connected to the primary screen 110, and may also be connected to the auxiliary screen 120. In order to facilitate the description, it is taken as an example for the description below that the driving chip 150 is connected to the primary screen 110.

As an example, referring continuously to FIG. 6, the primary screen 110 is provided with a driving region 140, and the driving chip 150 is connected within the driving region 140. In the displaying device, the driving region 140, along with the driving chip 150, is bent along the common edge of the driving region 140 and the primary screen 110, so that the driving region 140 and the driving chip 150 are located at the back surface of the primary screen 110.

A primary displaying region 111 is disposed inside the primary screen 110, a plurality of pixels arranged in an array are disposed within the primary displaying region 111, and the plurality of pixels cooperate with each other to display images. One pixel refers to one light emitting unit and includes a light emitting device and a driving circuit for driving the light emitting device.

The plurality of pixels arranged in an array within the primary displaying region 111 form a plurality of pixel columns, and each of the pixel columns includes a plurality of pixels. A plurality of first data lines are disposed within the primary displaying region 111, and each of the first data lines is connected to the driving circuit of one of the pixel columns to provide a data signal for this pixel column.

As an example, as shown in FIG. 6, the primary screen 110 includes the primary displaying region 111 that is circular and an annular first non-displaying region 112 that surrounds the primary displaying region 111, the plurality of pixels within the primary displaying region 111 form a plurality of pixel columns that extend in the illustrated vertical direction, and the first data lines also extend in the illustrated vertical direction.

First connecting lines are disposed inside the primary screen 110, one end of each of the first connecting lines is connected to the driving chip 150, and the other ends of the first connecting lines are connected to the first data lines, to transmit the data signals emitted by the driving chip 150 to the first data lines via the first connecting lines.

A plurality of first data lines are disposed within the primary displaying region 111, and correspondingly a plurality of first connecting lines may be disposed with each first connection line corresponding one-to-one with a first data line.

The quantity of the first connecting lines may also be less than the quantity of the first data lines, to reduce the border frame of the primary screen 110.

As an example, a data selecting circuit (Multiplexer, referred to for short as MUX) is disposed between the driving region 140 and the primary displaying region 111 of the primary screen 110 (for example, the first non-displaying region 112), and the first connecting lines are connected to the first data lines via the MUX. For example, the data selecting circuit is a 1:6MUX, and accordingly the quantity of the first connecting lines is equal to ⅙ of the quantity of the first data lines. In addition, after disposing the data selecting circuit, the power consumption of the displaying device can be reduced. Moreover, after disposing the data selecting circuit, the requirement on the quantity of the data-signal outputting channels of the driving chip 150 can be reduced, so that the selection range of the driving chip 150 is broader.

When the data selecting circuit is disposed inside the primary screen 110, the data selecting circuit may be located within the region of the illustrated lower semicircle of the first non-displaying region 112.

Furthermore, a gate driving circuit 124 (Gate On Array, referred to for short as GOA) and signal lines such as VDD, VSS and Vinit may further be disposed within the first non-displaying region 112.

In some examples, a test circuit (Cell Test, referred to for short as CT) may further be disposed within the first non-displaying region 112. The performance of the primary screen 110 is tested by using the test circuit, when the test passes, the driving chip 150 is bonded within the driving region 140. The test circuit may be located within the region of the upper semicircle of the first non-displaying region 112.

An auxiliary displaying region is disposed inside the auxiliary screen 120, a plurality of pixels arranged in an array are disposed within the auxiliary displaying region, and the plurality of pixels cooperate with each other to display images. The plurality of pixels arranged in an array within the auxiliary displaying region form a plurality of pixel columns, and each of the pixel columns includes a plurality of pixels. A plurality of second data lines 122 are disposed within the auxiliary displaying region, and each of the second data lines 122 is connected to the driving circuit of one of the pixel columns to provide a data signal for this pixel column.

Second connecting lines 123 are disposed inside the display panel 100, one end of each of the second connecting lines 123 is connected to the driving chip 150, and the other ends of the second connecting lines 123 are connected to the second data lines 122 passing through the connecting region 130 to make the data signals emitted by the driving chip 150 to be transmitted to the second data lines 122 via the second connecting lines 123.

In the embodiments of the present application, the second connecting lines 123 configured for providing the data signals for the pixels in the auxiliary screen 120 enter the primary screen 110 via the connecting region 130, so that the first connecting lines configured for providing the data signals for the pixels in the primary screen 110 can be converged with the second connecting lines 123, and in turn be connected to the driving chip 150. In other words, the primary screen 110 and the auxiliary screen 120 can share the driving chip 150, as compared with the case where the primary screen 110 and the auxiliary screen 120 are individually provided with a driving chip 150, the quantity of the driving chips 150 is reduced, and the power consumption is reduced.

As an example, the displaying device is provided with one driving chip 150, and the driving chip 150 provides the data signals for both of the primary screen 110 and the auxiliary screen 120 at the same time. For example, the outputting ports located within a middle region of the driving chip 150 are connected to the first connecting lines, and the outputting ports located within the regions at the two sides of the driving chip 150 are connected to the second connecting lines 123.

When the auxiliary screen 120 is a strip-shaped screen, the plurality of pixels included by each of the pixel columns are arranged in the extending direction of the first edge 121, and the second data lines 122 extend in the direction of the pixel columns, and are configured for that each of the second data lines 122 provides data signals to the pixels in one of the pixel columns. That the pixels in the pixel columns are arranged in the extending direction of the first edge 121 refers to that the arranging direction of the pixels is substantially the same as the extending direction of the first edge 121, which includes both that the arranging direction of the pixels and the extending direction of the first edge 121 are parallel, and that there is a certain included angle between the arranging direction of the pixels and the extending direction of the first edge 121.

Because the auxiliary screen 120 is a strip-shaped screen, the size of the auxiliary screen 120 in the extending direction of the first edge 121 is significantly greater than the size of the auxiliary screen 120 in the direction perpendicular to the first edge 121. In other words, the quantity of the pixels arranged in the extending direction of the first edge 121 is high, and the quantity of the pixels arranged in the direction perpendicular to the first edge 121 is low. The pixel columns extend in the direction of the first edge 121, so that the quantity of the pixels in each of the pixel columns is high, and the quantity of the pixel columns is low. Therefore, the quantity of the second data lines 122 that correspond to the pixel columns is low.

In an aspect, a low quantity of the second data lines 122 can result in a low quantity of the second connecting lines 123 connected to the second data lines 122, and a low quantity of the second connecting lines 123 can result in a low size of the connecting region 130, so as to facilitate the relative bending of the primary screen 110 and the auxiliary screen 120. When the second connecting lines 123 are wired within the first non-displaying region 112 inside the primary screen 110, the lesser second connecting lines 123 can reduce the area of the first non-displaying region 112, thus the border frame of the primary screen 110 is reduced to increase the screen-to-body ratio of the primary screen 110.

In another aspect, a low quantity of the second data lines 122 can result in a low quantity of the second connecting lines 123 connected to the second data lines 122, and a low quantity of the second connecting lines 123 can reduce the restriction on the quantity of the outputting channels of the driving chip 150, so that the primary screen 110 and the auxiliary screen 120 can be driven simultaneously by using one driving chip 150, and the power consumption is reduced.

Figure 7:
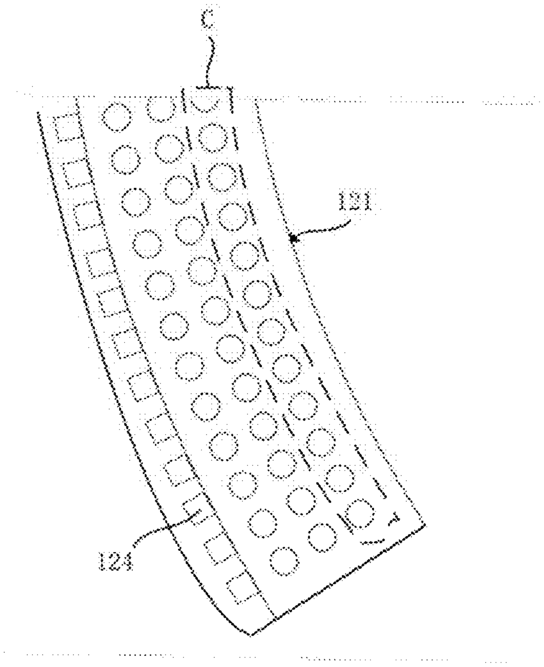
FIG. 7 is a partially enlarged view of the I in FIG. 6.

FIG. 7 is a partially enlarged view of the I in FIG. 6. As an example, as shown in FIG. 7, each of the circles in the figure represents one pixel, and the pixels inside the dotted-line block are a part of one pixel column C. It can be known from FIG. 7 that, when the pixels in the pixel column C are arranged in the extending direction of the first edge 121, the quantity of the pixel columns is low.

The plurality of pixels inside the auxiliary screen 120 may also form a plurality of pixel rows, and the plurality of pixels in the pixel rows are arranged in a second direction. The second direction intersects with the extending direction of the first edge 121. As an example, the second direction is perpendicular to the extending direction of the first edge

121. Referring continuously to FIG. 7, in the direction perpendicular to the first edge 121 in the figure, every three pixels form one pixel row.

When the auxiliary screen 120 is bent to form the ring-shaped screen, the plurality of pixels in the pixel rows may be arranged in the radial directions of the round ring.

FIG. 7 shows the case where the auxiliary screen 120 includes three pixel columns. In practical applications, the quantity of the pixel columns may be greater than three. For example, the resolution of the auxiliary screen 120 is 72*1260; in other words, the auxiliary screen 120 includes 72 pixel columns and 1260 pixel rows.

In practical applications, when one pixel column includes a high quantity of pixels, the displaying brightnesses of the different pixels in the same pixel column are different, which results in nonuniformity of the displaying brightness of the auxiliary screen 120. Moreover, as restricted by the driving capability of the driving chip 150, when one pixel column includes a high quantity of pixels, a part of the driving chip 150 cannot drive normally.

Figure 8:
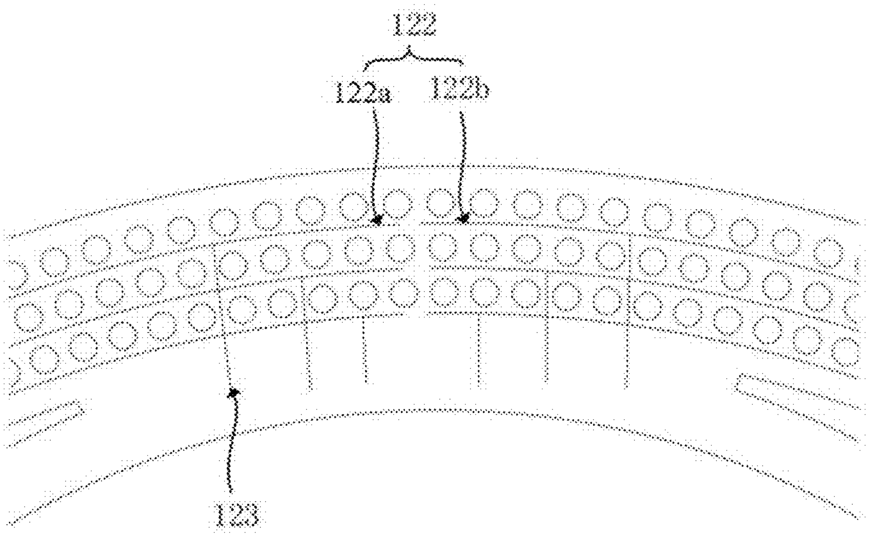
FIG. 8 is a partially enlarged view of the II in FIG. 6.

FIG. 8 is a partially enlarged view of the II in FIG. 6. As shown in FIG. 8, the second data lines 122 may be broken at a first position to form first data sub-lines 122*a* and second data sub-lines 122*b*, some of the second connecting lines 123 are connected to the first data sub-lines 122*a*, and some of the second connecting lines 123 are connected to the second data sub-lines 122*b*.

The first data sub-lines 122*a* are connected to some of the pixels in one pixel column, and the second data sub-lines 122*b* are connected to the remaining pixels in this pixel column, so that both of the quantity of the pixels connected to the first data sub-lines 122*a* and the quantity of the pixels connected to the second data sub-lines 122*b* are less than the quantity of the pixels included by one pixel column. The first data sub-lines 122*a* are connected to one outputting port of the driving chip 150 via one of the second connecting lines 123, and the second data sub-lines 122*b* are connected to another outputting port of the driving chip 150 via another second connecting line 123. The nonuniform displaying of the auxiliary screen 120 is improved, and the driving chip 150 is enabled to normally drive the pixels connected to the first data sub-lines 122*a* and the pixels connected to the second data sub-lines 122*b*.

Figure 9:
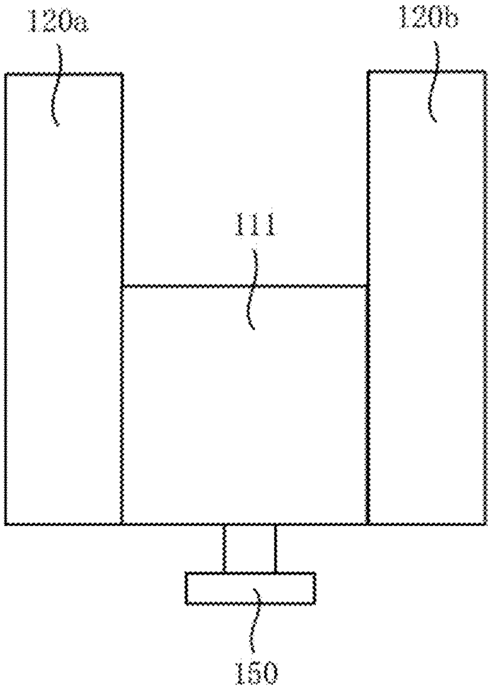
FIG. 9 is a driving principle diagram of a display panel according to an embodiment of the present application.

In other words, the auxiliary displaying region of the auxiliary screen includes a first region and a second region, and the first region and the second region are driven separately. As an example, as shown in FIG. 9, the resolution of the primary displaying region 111 is 384*384, the resolution of the auxiliary screen is 24*1260, the resolution of the first region 120*a* of the auxiliary screen is 24*630, the resolution of the second region 120*b* is 24*630, and the driving chip simultaneously drives the primary displaying region 111, the first region 120*a* and the second region 120*b*.

Each of the second data lines 122 may be broken at a certain position, to form one first data sub-line 122*a* and one second data sub-line 122*b*. The breaking positions of the different second data lines 122 may be the same, and may also be different.

Further, the first position may be the center position of the second data line 122. The second data line 122 is broken at the center position of the second data line 122, so that the lengths of the first data sub-line 122*a* and the second data sub-line 122*b* are equal. Thus the quantity of the pixels connected to the first data sub-line 122*a* and the quantity of the pixels connected to the second data sub-line 122*b* are substantially equal, so that the auxiliary screen 120 has a better uniformity of displaying.

Certainly, the first position may also not be the center position of the second data line 122, as long as the driving chip 150 can normally drive the pixels connected to the first data sub-line 122*a* and the second data sub-line 122*b*.

Referring continuously to FIG. 8, at the breaking position, the second data lines 122 form first ends located at the first data sub-lines 122*a* and second ends located at the second data sub-lines 122*b*. The first position is adjacent to the connecting region 130, some of the second connecting lines 123 are connected to the first ends, and some of the second connecting lines 123 are connected to the second ends.

Because the second connecting lines 123 pass through the connecting region 130, enter the auxiliary screen 120, and subsequently are connected to the second data lines 122 inside the auxiliary screen 120, the breaking position is adjacent to the connecting region 130, making it more convenient to connect the second connecting lines 123 with the first data sub-lines 122*a* and the second data sub-lines 122*b*.

In practical applications, the auxiliary screen 120 further includes a second non-displaying region surrounding the auxiliary displaying region, and the second connecting lines 123 may also enter the auxiliary screen 120 via the connecting region 130, be wired within the second non-displaying region, and subsequently be connected to the first data sub-lines 122*a* and the second data sub-lines 122*b* at a proper position. For example, the second connecting lines 123 are connected to the first data sub-lines 122*a* and the second data sub-lines 122*b* at the two ends of the auxiliary screen 120.

The auxiliary screen 120 includes a substrate, a driving circuit and a light emitting device, the driving circuit and the light emitting device are arranged sequentially in layer configuration on the substrate, the driving circuit includes a first conducting layer and a second conducting layer that are arranged in different layers, the second data lines 122 are located at the first conducting layer, a part of the wiring of the second connecting lines 123 is located at the second conducting layer, and the second connecting lines 123 and the second data lines 122 are connected through via holes. In this way, the second connecting lines 123 and the second data lines 122 can be connected more conveniently.

As an example, the display panel 100 includes a substrate, a driving-circuit layer and a light-emitting-device layer, the driving-circuit layer and the light-emitting-device layer are arranged sequentially in layer configuration on the substrate. The driving circuit may be of a double-SD-layer structure, which includes a first SD layer and a second SD layer (the first conducting layer), the second data lines 122 are located at the second SD layer, a third SD layer (the second conducting layer) may be disposed inside the display panel 100, the third SD layer is located at the side of the second SD layer away from the first SD layer, and the second connecting lines 123 are located at the third SD layer.

Because both of the primary screen 110 and the auxiliary screen 120 are a part of the display panel 100, the film-layer structures of the primary screen 110 and the auxiliary screen 120 may be the same. In other words, the primary screen 110 also includes a substrate, a driving circuit and a light emitting device, the driving circuit and the light emitting device are arranged sequentially in layer configuration on the substrate, the substrate of the primary screen 110 and the substrate of the auxiliary screen 120 are of an integral structure, the driving-circuit layer of the primary screen 110 and the driving-circuit layer of the auxiliary screen 120 are arranged in the same layer, and the light-emitting-device layer of the primary screen 110 and the light-emitting-device layer of the auxiliary screen 120 are arranged in the same layer.

The driving circuit includes a third conducting layer, and a part of the wiring of the second connecting lines 123 is located at the third conducting layer. The third conducting layer of the primary screen 110 and the second conducting layer of the auxiliary screen 120 may be the same layer. In other words, the driving circuit inside the primary screen 110 is also of a double-SD-layer structure, which includes a first SD layer and a second SD layer, and the first data lines are located at the second SD layer. A third SD layer (the third conducting layer) may be disposed inside the display panel 100, the third SD layer is located at the side of the second SD layer away from the first SD layer, and the second connecting lines 123 are located at the third SD layer.

In this way, the second connecting lines 123 can pass through the primary displaying region 111 of the primary screen 110 and enter the connecting region 130, to result in a shorter wiring of the second connecting lines 123, to reduce the consumption. Moreover, because wiring within the first non-displaying region 112 is not required, the screen-to-body ratio of the primary screen 110 is high.

Certainly, a part of the wiring of the second connecting lines 123 may also be located within the first non-displaying region 112, in this way, the wiring within the primary displaying region 111 can be simpler.

A data selecting circuit (MUX) may be disposed within the connecting region 130, and the second connecting lines 123 are connected to the second data lines 122 via the data selecting circuit. When the data selecting circuit is disposed, the power consumption of the displaying device can be reduced. Moreover, after disposing the data selecting circuit, the requirement on the quantity of the data-signal outputting channels of the driving chip 150 can be reduced, so that the selection range of the driving chip 150 is broader. For example, after disposing the data selecting circuit, one driving chip 150 can simultaneously drive the primary screen 110 and the auxiliary screen 120.

When a part of the wiring of the second connecting lines 123 is located within the first non-displaying region 112, by disposing the data selecting circuit, the quantity of the second connecting lines 123 can be reduced, thereby the area of the first non-displaying region 112 is reduced so as to increase the screen-to-body ratio of the primary screen 110.

Referring continuously to FIG. 7, a gate driving circuit 124 is disposed within the second non-displaying region, and the gate driving circuit 124 is located at a second edge of the auxiliary screen 120, wherein the second edge and the first edge 121 are opposite. When the gate driving circuit 124 is disposed at the first edge 121, the size of the border frame located at the first edge 121 is increased, so that the distance between the primary displaying region inside the primary screen and the auxiliary displaying region inside the auxiliary screen is increased, that is, the border frame is large. However, by disposing the gate driving circuit 124 on the edge opposite to the first edge 121, the distance between the primary displaying region and the auxiliary displaying region can be reduced, the visual effect is better.

The second conducting layer further includes a signal line, one end of the signal line is configured to be connected to the driving chip 150, and the other end of the signal line is connected to the gate driving circuit 124 passing through the connecting region 130 and the auxiliary displaying region. As an example, the driving circuit is of a double-SD-layer structure, which includes a first SD layer and a second SD layer, the second data lines are located at the second SD layer, a third SD layer (the second conducting layer) may be disposed inside the display panel 100, the third SD layer is located at the side of the second SD layer away from the first SD layer, and the signal lines are located at the third SD layer.

The VSS lines of the primary screen 110 may be disposed within the annular first non-displaying region 112, and the VSS lines are required to be lap-joined to the cathodes of the light emitting devices. Because the display panel is an abnormal-shaped screen, in order to prevent imperfect of the lap-joining structure caused by deformation of the mask when the cathodes are lap-joined, the cathode lap-joining may be performed within the lower half-ring region of the annular first non-displaying region 112 shown in FIG. 6.

The above are merely specific embodiments of the present application, and the protection scope of the present application is not limited thereto. All of the variations or substitutions that a person skilled in the art can easily envisage within the technical scope disclosed by the present application should fall within the protection scope of the present application. Therefore, the protection scope of the present application should be subject to the protection scope of the claims.

The invention claimed is:

1. A display panel, wherein the display panel comprises a primary screen, an auxiliary screen and a connecting region, the primary screen and the auxiliary screen are connected via the connecting region, and the auxiliary screen at least partially surrounds the primary screen;

a primary displaying region is disposed inside the primary screen, a plurality of first data lines are disposed within the primary displaying region, and the first data lines are configured to provide data signals to a plurality of pixels within the primary displaying region; and an auxiliary displaying region is disposed inside the auxiliary screen, a plurality of second data lines are disposed within the auxiliary displaying region, and the second data lines are configured to provide data signals to a plurality of pixels within the auxiliary displaying region; and a plurality of first connecting lines and a plurality of second connecting lines are disposed inside the display panel, and one end of each of the first connecting lines and one end of each of the second connecting lines are electrically connected to a driving chip to obtain data signals of the driving chip; and the other ends of the first connecting lines are connected to the first data lines, and the other ends of the second connecting lines are connected to the second data lines passing through the connecting region;

wherein the auxiliary screen is a strip-shaped screen, the strip-shaped screen comprises a first edge extending in a length direction, and the first edge at least partially surrounds a periphery of the primary screen;

wherein the auxiliary displaying region comprises a plurality of pixel columns, and a plurality of pixels comprised by each of the plurality of pixel columns are arranged in an extending direction of the first edge; and the second data lines extend in a direction of the pixel columns, and are configured for that each of the second data lines provides data signals to the pixels in one of the pixel columns;

wherein the second data lines are broken at a first position, to form first data sub-lines and second data sub-lines, some of the second connecting lines are connected to the first data sub-lines, and some of the second connecting lines are connected to the second data sub-lines.

2. The display panel according to claim 1, wherein at the first position, the second data lines form first ends located at the first data sub-lines and second ends located at the second data sub-lines; and the first position is adjacent to the connecting region, some of the second connecting lines are connected to the first ends, and some of the second connecting lines are connected to the second ends.

3. The display panel according to claim 2, wherein the auxiliary screen comprises a substrate, a driving circuit and a light emitting device, the driving circuit and the light emitting device are arranged sequentially in layer configuration on the substrate, the driving circuit comprises a first conducting layer and a second conducting layer that are arranged in different layers, the second data lines are located at the first conducting layer, a part of wiring of the second connecting lines is located at the second conducting layer, and the second connecting lines and the second data lines are connected through via holes.

4. The display panel according to claim 1, wherein a first non-displaying region surrounding the primary displaying region is disposed inside the primary screen, the first non-displaying region is connected to the connecting region, and a part of wiring of the second connecting lines is located within the first non-displaying region.

5. The display panel according to claim 1, wherein a part of wiring of the second connecting lines is located within the primary displaying region.

6. The display panel according to claim 5, wherein the primary displaying region comprises a substrate, a driving circuit and a light emitting device, the driving circuit and the light emitting device are arranged sequentially in layer configuration on the substrate, the driving circuit comprises a third conducting layer, and a part of the wiring of the second connecting lines is located at the third conducting layer.

7. The display panel according to claim 1, wherein a data selecting circuit is disposed within the connecting region, and the second connecting lines are connected to the second data lines via the data selecting circuit.

8. The display panel according to claim 3, wherein the auxiliary displaying region comprises a plurality of pixel rows, and a plurality of pixels comprised by each of the pixel rows are arranged in a second direction, wherein the second direction intersects with the extending direction of the first edge; and a second non-displaying region surrounding the auxiliary displaying region is disposed inside the auxiliary screen, a gate driving circuit is disposed within the second non-displaying region, and the gate driving circuit is located at a second edge of the auxiliary screen, wherein the second edge and the first edge are opposite.

9. The display panel according to claim 8, wherein the second conducting layer further comprises a signal line, one end of the signal line is configured to be connected to the driving chip, and the other end of the signal line is connected to the gate driving circuit passing through the connecting region and the auxiliary displaying region.

10. The display panel according to claim 8, wherein the auxiliary screen is a ring-shaped screen, and the plurality of pixels in the pixel rows are arranged in radial directions of the auxiliary screen.

11. A displaying device, wherein the displaying device comprises the display panel according to claim 1.

12. The displaying device according to claim 11, wherein the connecting region of the display panel is bent, and there is a predetermined included angle between a light-exiting surface of the primary screen and a light-exiting surface of the auxiliary screen.

13. The displaying device according to claim 11, wherein at the first position, the second data lines form first ends located at the first data sub-lines and second ends located at the second data sub-lines; and the first position is adjacent to the connecting region, some of the second connecting lines are connected to the first ends, and some of the second connecting lines are connected to the second ends.

14. The displaying device according to claim 13, wherein the auxiliary screen comprises a substrate, a driving circuit and a light emitting device, the driving circuit and the light emitting device are arranged sequentially in layer configuration on the substrate, the driving circuit comprises a first conducting layer and a second conducting layer that are arranged in different layers, the second data lines are located at the first conducting layer, a part of wiring of the second connecting lines is located at the second conducting layer, and the second connecting lines and the second data lines are connected through via holes.

* * * * *